No. 705,711. Patented July 29, 1902.
H. C. SCHNEIDER.
EXTENSION TABLE.
(Application filed Mar. 27, 1901.)
(No Model.)

Witnesses:

Inventor
Henry C. Schneider
Erwin & Wheeler
Attorneys.

UNITED STATES PATENT OFFICE.

HENRY C. SCHNEIDER, OF NORTH MILWAUKEE, WISCONSIN.

EXTENSION-TABLE.

SPECIFICATION forming part of Letters Patent No. 705,711, dated July 29, 1902.

Application filed March 27, 1901. Serial No. 53,036. (No model.)

*To all whom it may concern:*

Be it known that I, HENRY C. SCHNEIDER, a citizen of the United States, residing at the village of North Milwaukee, county of Milwaukee, and State of Wisconsin, have invented new and useful Improvements in Knockdown Tables, of which the following is a specification.

My invention relates to improvements in knockdown extension-tables.

The object of my invention is to provide a form of table in which supporting-legs of any style may be readily and quickly removed and replaced to facilitate the storage or transportation of the table. Heretofore tables have been constructed in which the supporting-legs were secured by means of screws adapted to enter the leg in a longitudinal direction; but as it was necessary to turn the legs on the screws until they were secured rigidly in place it was also necessary that the legs should be round, as it was impossible to adjust them in this manner with the same side always to the front. It was also necessary that each leg should be independently secured in position, as the screws could not be turned on account of their location in the corner of the table, and it was necessary to turn the legs into position. By my invention, however, these difficulties are overcome, the legs being secured in position by means of a binding-key, which not only permits of the legs being connected in pairs by means of cross-pieces, but also allows the user to adjust the leg in exactly the desired position before driving in the key, thus enabling him to use legs of any style, with ornamental outer surfaces and plain interior surfaces, if desired.

In the following description reference is had to the accompanying drawings, in which—

Figure 1:
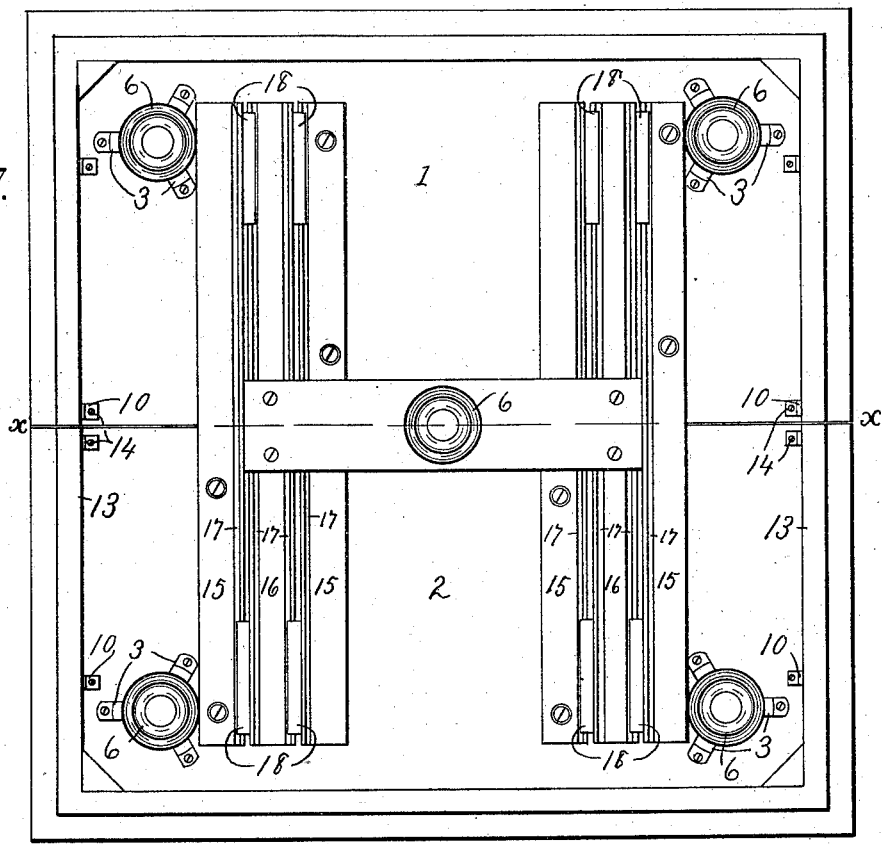
Figure 2:
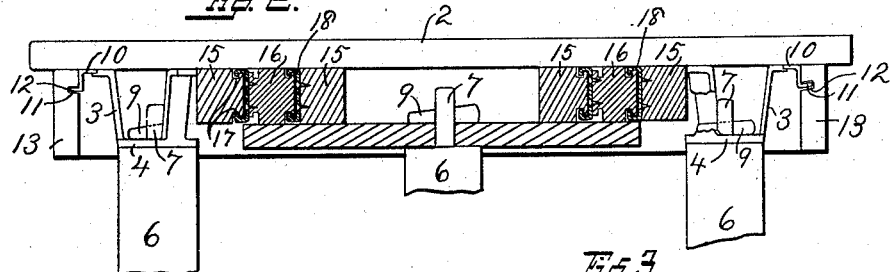
Figure 3:
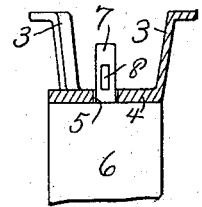

Figure 1 is a view of my improved table as seen from the under side. Fig. 2 is a sectional view on line *x x* of Fig. 1. Fig. 3 is a detail view of one of the leg-brackets and a portion of the leg.

Like parts are identified by the same reference-numerals throughout the several views.

The table-top is formed in two sections 1 and 2, as in all ordinary extension-tables. At or near the corners are depending leg-supporting brackets having arms 3 rigidly secured to the table-top and leg-receiving plates 4, provided with central apertures 5. The legs 6 are adapted to fit end to end with the brackets and are each provided with a longitudinally-projecting bolt 7, which enters the aperture 5 in the bracket. These bolts are provided with slots 8, through which the keys 9 are passed in the rear of the bracket-plates 4, whereby the legs are secured in position. With this construction the legs are bound securely to the bracket-plates, but may be readily removed or released merely by manipulating the keys. The apertures 5 are so formed as to permit the bolt to turn freely therein, the bolt being preferably round in cross-section, as shown. It is therefore unnecessary to adjust the bolts in the legs with reference to the desired position of the latter, as the legs can first be adjusted to the plates 4 and then turned to any desired position.

To secure the top to the side rails, I have provided the top boards with brackets 10, having offset lips or flanges 11, the latter being tilted upwardly toward the free ends in the direction of the table-top. These lips 11 are engaged in angular channels 12 in the side rails 13 and serve to secure the table-top thereto while moving freely in the channels with any expansion or contraction of the top boards. When securing the top to the side rails, the lips 11 are first inserted in the channels 12 and the brackets then moved to the desired point of attachment to the top board, whereupon they are secured in position by screws 14. The opposing extension-slides 15 and 16 are formed with grooves 17 in their upper and lower surfaces near their inner or opposing surfaces and metallic ferrules or open-sided collars 18 are secured to the inner faces of the slides 15 and 16 at opposite ends of the slides, the free edges of the ferrules being formed to extend inwardly, so as to engage in the grooves 17, as best shown in Fig. 3. In this manner the slides are bound together at each end, and owing to the double engagement in grooves on both the upper and lower surfaces of the slides an extremely firm and durable union is provided. The slides constructed in this manner will also be less likely to cramp in their bearings. In the present application, however, I make no claim to the construction of the slides or to the attaching devices for the top and side rails, but have limited the claims of this application to the peculiar form of leg-fastening herein shown and described, pursuant to the official requirement for a division of this application made April 23, 1901.

Having thus described my invention, what I claim as new, and desire to secure by Letters Patent, is—

1. In a table, the combination of a table-top; apertured plates connected therewith, with an intervening space between the plate and table-top; legs having their upper ends fitted to said plates; slotted bolts, round in cross-section, extending longitudinally from the legs and adapted to project through the apertures in the plates; and tapered keys adapted to enter the slots in said bolts above the plates, with their lower edges bearing on the latter, whereby the legs may be rigidly secured in position.

2. In an extension-table, the combination with a table-top; of leg-supporting brackets secured thereto comprising a series of dependent arms 3 and leg-receiving plates 4, with a central aperture 5 in each leg-receiving plate; legs provided with slotted bolts projecting longitudinally from their upper ends, and adapted to enter said apertured bracket-plates; and keys adapted to be inserted between the arms 3 of the brackets, and to fit in the bolt-slots, said keys being wedge-shaped in form with a maximum width greater than the length of the bolt-slots, whereby, when forced into position in said slots, the legs are securely bound to the bracket-plates 4.

3. In a table, the combination of a table-top; apertured plates connected therewith, with an intervening space between the plate and top; legs having their upper ends fitted to said plates; slotted bolts extending longitudinally from the legs and adapted to project through the apertures in the plates; and tapered keys adapted to enter the slots in said bolts, above the plates, with their lower edges bearing on the latter; said apertures in the plates being adapted to permit the bolts to turn freely after their insertion, whereby the legs may be adjusted to any desired position.

In testimony whereof I affix my signature in the presence of two witnesses.

HENRY C. SCHNEIDER.

Witnesses:
JAS. B. ERWIN,
LEVERETT C. WHEELER.